United States Patent
Yoon et al.

(10) Patent No.: US 12,272,301 B2
(45) Date of Patent: Apr. 8, 2025

(54) DISPLAY DEVICE AND DRIVING METHOD THEREOF

(71) Applicant: LG Display Co., Ltd., Seoul (KR)

(72) Inventors: Sanghun Yoon, Paju-si (KR); Jaehyun You, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/676,089

(22) Filed: May 28, 2024

(65) Prior Publication Data

US 2024/0312400 A1  Sep. 19, 2024

Related U.S. Application Data

(63) Continuation of application No. 18/227,948, filed on Jul. 30, 2023, now Pat. No. 12,020,634, which is a
(Continued)

(30) Foreign Application Priority Data

Nov. 20, 2020 (KR) .......................... 10-2020-0157158

(51) Int. Cl.
*G09G 3/32* (2016.01)

(52) U.S. Cl.
CPC ........ *G09G 3/32* (2013.01); *G09G 2300/0842* (2013.01); *G09G 2310/0275* (2013.01); *G09G 2310/08* (2013.01)

(58) Field of Classification Search
CPC ............. G09G 3/32; G09G 2300/0842; G09G 2310/0275; G09G 2310/08;
(Continued)

(56) References Cited

U.S. PATENT DOCUMENTS

| 10,004,124 B1 | 6/2018 | Ko et al. |
| 10,636,356 B1 | 4/2020 | Qian et al. |

(Continued)

FOREIGN PATENT DOCUMENTS

| CN | 111354315 A | 6/2020 |
| CN | 111798801 A | 10/2020 |

(Continued)

OTHER PUBLICATIONS

Examination Report dated Mar. 15, 2023, issued in corresponding UK Patent Application No. GB2116516.2.
(Continued)

*Primary Examiner* — Andrew Sasinowski
(74) *Attorney, Agent, or Firm* — Morgan, Lewis & Bockius LLP

(57) ABSTRACT

In a display device and driving method thereof, a display device includes: a display panel including a pixel, the pixel including a light-emitting device (LED), the pixel receiving a data signal (DS) corresponding to a gate signal, the LED emitting light by a driving current flowing from a first power voltage to a second power voltage in response to the DS, the pixel receiving a reset voltage at least once after receiving one DS and before receiving a next DS, a data driver circuit supplying the DS to the pixel through a data line, a gate driver circuit for: supplying the gate signal to the pixel through a gate line, and outputting a light emission control signal for controlling supply of one of the reset voltage and the first power voltage to the LED, and a timing controller controlling the data driver circuit and the gate driver circuit.

20 Claims, 18 Drawing Sheets

Related U.S. Application Data continuation of application No. 17/526,683, filed on Nov. 15, 2021, now Pat. No. 11,749,177.

(58) Field of Classification Search
CPC ... G09G 2300/0861; G09G 2320/0626; G09G 3/3233; G09G 2310/061; G09G 5/10; G09G 2320/0247; G09G 3/30; G09G 3/3208; G09G 3/3275; G09G 3/3266; G09G 2320/0233

See application file for complete search history.

(56) References Cited

U.S. PATENT DOCUMENTS

| | | |
|---|---|---|
| 2018/0233085 A1 | 8/2018 | Wang |
| 2018/0294328 A1 | 10/2018 | Kanaya |
| 2019/0051242 A1 | 2/2019 | Lee et al. |
| 2019/0057646 A1* | 2/2019 | Lin .................. G09G 3/3233 |
| 2019/0189053 A1 | 6/2019 | Kim et al. |
| 2019/0325826 A1 | 10/2019 | Yang et al. |
| 2019/0347980 A1* | 11/2019 | Kuo .................. G09G 3/32 |
| 2019/0378460 A1* | 12/2019 | Hung .................. G09G 3/325 |
| 2020/0051500 A1 | 2/2020 | Lin et al. |
| 2020/0105799 A1 | 4/2020 | Yuan |
| 2020/0160788 A1 | 5/2020 | Son |
| 2021/0012711 A1 | 1/2021 | Huang et al. |
| 2021/0118367 A1 | 4/2021 | Chen |

FOREIGN PATENT DOCUMENTS

| | | |
|---|---|---|
| KR | 10-2020-0080787 A | 7/2020 |
| TW | 201935451 A | 9/2019 |
| TW | 202001846 A | 1/2020 |

OTHER PUBLICATIONS

Office Action issued on Jan. 16, 2024 for counterpart Korean Patent Application No. 10-2020-0157158.

Office Action dated Dec. 20, 2022, issued by the Taiwan Patent Office in corresponding Taiwan Patent Application No. 110141860.

Combined Search and Examination Report from the UK IPO dated May 18, 2022, in counterpart UK Patent Application No. GB2116516.2.

First Office Action issued on Oct. 23, 2024 for counterpart Taiwanese Patent Application No. 112131032 (with partial English translation) (Note: US 2020/0051500 A1 cited in this TW Office Action is already of record.).

First Office Action issued on Oct. 26, 2024 for counterpart Chinese Patent Application No. 202111337993.8 (with English translation) (Note: KR 10-2020-0080787 A, U.S. Pat. No. 10,636,356 B1, CN 111798801 A, US 2019/0057646 A1, and US 2019/0347980 A1 cited in this CN Office Action are already of record.).

Office Action issued on Jan. 7, 2025 for counterpart U.K. Patent Application No. GB2417140.7.

* cited by examiner

FIG.5A

| Trefresh | Trefresh | Trefresh | ... | Trefresh |
|---|---|---|---|---|

*FIG.5B*

| Trefresh | Treset | Treset | · · · | Treset |

DISPLAY DEVICE AND DRIVING METHOD THEREOF

CROSS-REFERENCE TO RELATED APPLICATION(S)

This application is a Continuation of co-pending U.S. patent application Ser. No. 18/227,948, filed on Jul. 30, 2023, which claims the benefit of and priority to U.S. patent application Ser. No. 17/526,683, filed on Nov. 15, 2021, which claims the benefit of and priority to Korean Patent Application No. 10-2020-0157158, filed on Nov. 20, 2020. The entirety of each of the above prior U.S. and Korean patent applications is hereby incorporated by reference.

BACKGROUND

1. Technical Field

The present disclosure relates to a display device and driving method thereof.

2. Discussion of the Related Art

As an information society develops, demands for display devices for displaying images are increasing in various forms. As a display device, various types of display devices, such as a liquid crystal display device (LCD) and an electroluminescence display device (ELD), are used.

The electroluminescent display device (ELD) may include a quantum-dot light-emitting display device, including a quantum-dot, an inorganic light-emitting display device, and an organic light-emitting display device. Among the above display devices, an electroluminescent display device (ELD) has an advantage in that a response speed, a viewing angle, color reproducibility, and the like can be very excellently implemented, and also can be implemented to be thin as compared with other display devices.

The above display devices can display a still image. When a still image is displayed on the display device, power consumption can be reduced by driving at a low frequency. When the display device is driven at a low frequency, the time of a frame increases as long as the data signal written to the pixel is maintained. In addition, when a still image is displayed on the display device, the same data signal may be written to the pixel during a plurality of frames.

SUMMARY

Accordingly, the present disclosure is directed to a display device and driving method thereof that substantially obviate one or more of the issues due to limitations and disadvantages of the related art.

Even if the same data signal is written to the pixel during a plurality of frames, the luminance may decrease between one frame and the next frame. When driving at a high frequency, the user does not recognize that the luminance decreases, but when driving at a low frequency, the user may recognize that the luminance decreases. Accordingly, the inventors of the present disclosure have invented a display device and a driving method thereof that reduce, avoid, or prevent a user from recognizing that the luminance decreases while driving at a low frequency.

According to an aspect of the present disclosure, by selectively selecting one of a high frequency and a low frequency to be driven, there is an effect of reducing power consumption consumed in the display device.

In addition, according to another aspect of the present disclosure, when the display device is driven at a low frequency, a change in luminance occurring in the display device can be minimized, thereby reducing or preventing deterioration of image quality.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, there is provided a display device, including: a display panel including a pixel, the pixel including a light-emitting device, the pixel being configured to receive a data signal corresponding to a gate signal, the light-emitting device being configured to emit light by a driving current flowing from a first power voltage to a second power voltage in response to the data signal, the pixel being further configured to receive a reset voltage at least once after receiving one data signal and before receiving a next data signal, a data driver circuit configured to supply the data signal to the pixel through a data line, a gate driver circuit configured to: supply the gate signal to the pixel through a gate line, and output a light emission control signal for controlling supply of one of the reset voltage and the first power voltage to the light-emitting device, and a timing controller configured to control the data driver circuit and the gate driver circuit.

In another aspect, there is provided a display device, including: a display panel configured to be driven in one of: a first frequency mode in which a data signal is supplied in response to a first frequency, and a second frequency mode in which the data signal is supplied in response to a second frequency lower than the first frequency, a gate driver circuit configured to supply a gate signal and a light emission control signal to the display panel, a data driver circuit configured to supply the data signal to the display panel, and a timing controller configured to control the data driver circuit and the gate driver circuit, wherein each of the first frequency mode and the second frequency mode includes: at least one light emission period, and at least one non-light emission period, and wherein, in the first frequency mode and the second frequency mode, a number of times that the light emission period and the non-light emission period are generated is the same.

In another aspect, there is provided a driving method of a display device including a pixel including a light-emitting device, the pixel receiving a data signal corresponding to a gate signal, the light-emitting device emitting light by a driving current flowing from a first power voltage to a second power voltage in response to the data signal, the driving method including: supplying the data signal and the first power voltage to the pixel, supplying a driving current, generated in response to the data signal, to the light-emitting device in the pixel, while the pixel holds the data signal: cutting off the first power voltage supplied to the pixel, and supplying a reset voltage to the pixel, supplying the first power voltage to the pixel again, and supplying the data signal to the pixel again.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages may be discussed below in conjunction with embodiments of the disclosure. It is to be understood that both the foregoing general description and the following detailed description of the present disclosure may be examples and explanatory, and may be intended to provide further explanation of the disclosure as claimed.

BRIEF DESCRIPTION OF THE DRAWINGS

The accompanying drawings, that may be included to provide a further understanding of the disclosure and may be incorporated in and constitute a part of this disclosure, illustrate embodiments of the disclosure and together with the description serve to explain various principles of the disclosure.

FIGS. 5A and 5B are timing diagrams illustrating an operation of a display device according to example embodiments of the present disclosure.

Figure 1:
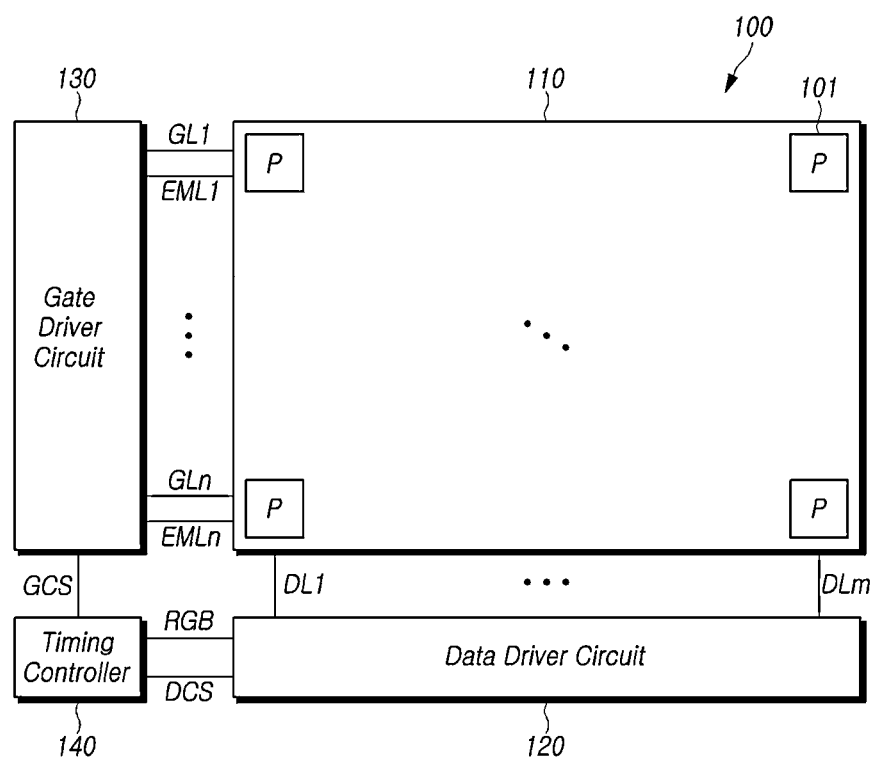
FIG. 1 is a plan view illustrating a display device according to example embodiments of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure may be merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. When terms "include," "have," and "include" described in the present disclosure may be used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used. In describing a time relationship, when the temporal order is described as, for example, "after," "subsequent," "next," or "before," a case that is not continuous may be included, unless a more limiting term, such as "just," "immediate(ly)," or "direct(ly)," is used.

It will be understood that, although the terms "first," "second," etc. May be used herein to describe various elements, these elements should not be limited by these terms. These terms may be only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms may be merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings may be given merely for the convenience of description, and embodiments of the present disclosure may not be limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, example embodiments of the present disclosure will be described in detail with reference to the accompanying drawings.

FIG. 1 is a plan view illustrating a display device according to example embodiments of the present disclosure.

With reference to the example of FIG. 1, a display device 100 may include a display panel 110, a data driver circuit 120, a gate driver circuit 130, and a timing controller 140. The display panel 110 may include a plurality of pixels (P) 101. The plurality of pixels 101 may be arranged in a matrix form within the display panel 110, but embodiments are not limited thereto. Each of the plurality of pixels 101 may emit light of various colors, such as red, green, or blue. However, the colors of light emitted from each pixel are not limited thereto. Also, for example, the display panel 110 may have a rectangular shape.

A plurality of gate lines GL1 to GLn and a plurality of data lines DL1 to DLm may be disposed on the display panel 110. The plurality of pixels 101 may be connected to the gate lines GL1 to GLn and the data lines DL1 to DLm. Each pixel 101 may receive a data signal transmitted through the corresponding data line among the data lines DL1 to DLm in response to a gate signal transmitted through the corresponding gate line among the gate lines GL1 to GLn. In addition, a plurality of light emission control lines EML1 to EMLn may be disposed on the display panel 110. The light emission control lines EML1 to EMLn may transmit light emission control signals to the plurality of pixels 101, so that the time for the plurality of pixels 101 to emit light may be controlled.

The data driver circuit 120 may be electrically connected to the plurality of data lines DL1 to DLm to transmit the data signal to the pixel 101 through the data lines DL1 to DLm. In the example of FIG. 1, although one data driver circuit 120 is shown, embodiments are not limited thereto. In addition, the data driver circuit 120 may supply a reset voltage to the plurality of data lines DL1 to DLm. However, embodiments are not limited thereto; for example, the reset voltage may be transmitted through separate lines different from the plurality of data lines DL1 to DLm. The data driver circuit 120 may be an integrated circuit.

The gate driver circuit 130 may be electrically connected to the plurality of gate lines GL1 to GLn, and may supply gate signals to the plurality of pixels 101 through the plurality of gate lines GL1 to GLn. The gate driver circuit 130 may be electrically connected to the plurality of light emission control lines EML1 to EMLn, and may supply light emission control signals to the plurality of pixels 101 through the plurality of light emission control lines EML1 to EMLn.

In the example of FIG. 1, the gate driver circuit 130 is shown to be disposed on one side of the display panel 110, but embodiments are not limited thereto, the gate driver circuit 130 may be disposed on both sides of the display panel 110. Further, the display device 100 may not include a separate gate driver circuit separated from the display panel 110, but may include a gate driver circuit 130 disposed in the display panel 110 in a gate generating circuit type, which may be referred to as a gate-in-panel (GIP) type. When the gate driver circuit 130 is included in the display device 100 in the gate generating circuit type (e.g., the GIP type), the gate driver circuit 130 may be on the display panel 110 while the plurality of pixels 101 are on the display panel 110.

The timing controller 140 may control the data driver circuit 120 and the gate driver circuit 130. The timing controller 140 may supply the image signal RGB and the data control signal DCS to the data driver circuit 120, and may supply the gate control signal GCS to the gate driver circuit 130.

In addition, the display device 100 may operate in a first frequency mode that emits light in response to a first frequency, and a second frequency mode that emits light in response to a second frequency lower than the first frequency. An image displayed on the display device 100 has a plurality of frames. If the image is driven in the second frequency mode, the time for which one frame is maintained becomes longer. When the time for which one frame is held increases, the number of signals generated and processed by the data driver circuit 120, the gate driver circuit 130, and the timing controller 140 may decrease. Accordingly, power consumption in the display device 100 may be lowered. Accordingly, when the display device 100 operates in the second frequency mode, power consumption of the display device 100 may be lowered. In addition, while the display device 100 is operating in the second frequency mode, the pixel 101 may receive the reset voltage. The timing controller 140 may select that the display device 100 operates in a first frequency mode or a second frequency mode, and may control the data driver circuit 120 and the gate driver circuit 130, according to the selected first frequency mode or the second frequency mode.

Figure 2A:
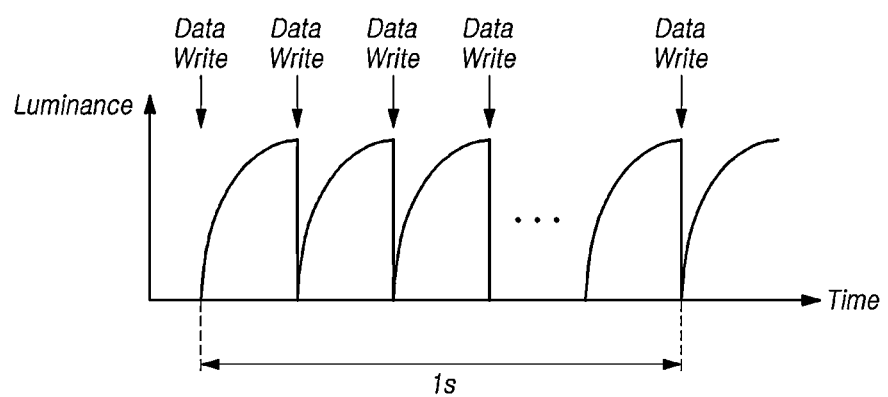
FIGS. 2A and 2B are timing diagrams illustrating a change in luminance in a display device according to example embodiments of the present disclosure.
Figure 2B:
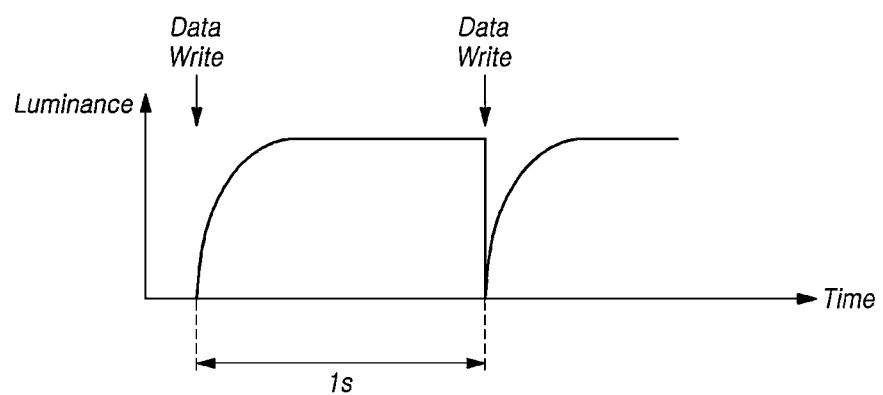

FIGS. 2A and 2B are timing diagrams illustrating a change in luminance in a display device according to example embodiments of the present disclosure.

FIG. 2A shows a case of operating in a first frequency mode. FIG. 2B shows a case of operating in a second frequency mode.

With reference to the examples of FIGS. 2A and 2B, the display device 100 may operate in the first frequency mode operating in response to the first frequency, and a second frequency mode operating in response to a second frequency lower than the first frequency. For example, the first frequency may be 60 Hz, and the second frequency may be 1 Hz. However, values of the first frequency and the second frequency are not limited thereto.

As illustrated in FIG. 2A, when the display device 100 is driven at 60 Hz, the data signal may be written to the pixel 101 sixty (60) times in one second (1 s). On the other hand, as illustrated in FIG. 2B, when the display device 100 is driven at 1 Hz, a data signal may be written to the pixel 101 once every second (1 s). A period in which a data signal is newly written in the pixel 101 and an image is displayed corresponding to the written data signal may be referred to as a "refresh period."

The pixel 101 may include a plurality of transistors. When a data signal is written to the pixel 101, a kickback phenomenon may occur due to the operation of transistors included in the pixel 101. The luminance of light emitted from the pixel 101 may be lowered due to the kickback phenomenon that occurs when the data signal is written to the pixel 101.

Accordingly, as shown in FIG. 2A, when the display device 100 is driven at 60 Hz, the image displayed on the display device 100 has a luminance decrease of sixty (60) times per second (1 s). As shown in FIG. 2B, when the display device 100 is driven at 1 Hz, an image displayed on the display device 100 may have a luminance decrease once every 1 second (1 s).

If the luminance decrease occurs sixty (60) times in 1 second (1 s), the user may not be able to recognize that the luminance decreases in the image displayed on the display device 100. However, when the luminance decrease occurs once every second (1 s) in the displayed image, the user may recognize that the luminance of the image displayed on the display device 100 decreases.

Therefore, when the display device 100 is driven in a second frequency mode that operates in response to the second frequency to reduce power consumption, the user may recognize that the image displayed on the display device 100 is flickering. When a still image is displayed on the display device 100, the user may feel a flickering of the image displayed on the display device 100 to a greater extent.

Figure 3:
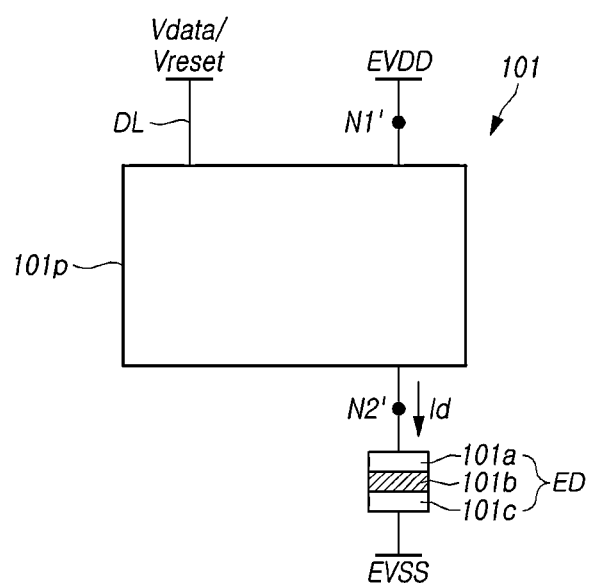
FIG. 3 is a conceptual diagram illustrating a pixel illustrated in FIG. 1.
Figure 4:
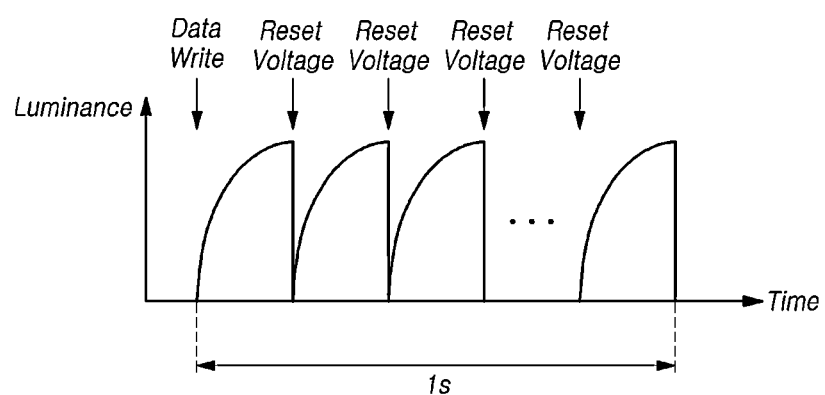
FIG. 4 is a timing diagram illustrating that luminance is changed by a reset voltage in the pixel shown in FIG. 3.

FIG. 3 is a conceptual diagram illustrating the pixel 101 illustrated in FIG. 1. FIG. 4 is a timing diagram illustrating that luminance is changed by a reset voltage in the pixel shown in FIG. 3.

With reference to the examples of FIGS. 3 and 4, the pixel 101 may include a light-emitting device ED that emits light by receiving a driving current Id, and a pixel circuit 101p supplying the driving current Id to the light-emitting device ED. The light-emitting device ED may include an anode electrode 101a, a cathode electrode 101c, and a light-emitting layer 101b disposed between the anode electrode 101a and the cathode electrode 101c. For example, the light-emitting device ED may be a light-emitting diode. For example, the light-emitting device ED may be an organic light-emitting diode (OLED).

The pixel circuit 101p may receive a first power voltage EVDD from a first node N1. The pixel circuit 101p may receive a data signal Vdata or a reset voltage Vreset from a data line DL. Further, by the operation of the pixel circuit 101p, a second node N2 may be electrically connected to a point (e.g., a first node N1) where the first power voltage EVDD may be applied through the pixel circuit 101p, or the second node N2 may be applied with the reset voltage Vreset through the pixel circuit 101p. When the second node N2 is electrically connected to the anode electrode 101a of the light-emitting device ED, the anode electrode 101a of the light-emitting device ED may be electrically connected to the first power voltage EVDD or may be applied with the reset voltage Vreset. The voltage level of the first power voltage EVDD may be higher than the voltage level of the second power voltage EVSS. Also, the voltage level of the reset voltage Vreset may be a voltage level that is lower than the threshold voltage of the light-emitting device ED.

By the operation of the pixel circuit 101p, the first power voltage EVDD may be applied to the anode electrode 101a of the light-emitting device ED, and the second power voltage EVSS may be applied to the cathode electrode 101c. Then, the voltage level of the anode electrode 101a may become higher than the voltage level of the cathode electrode 101c. Accordingly, the driving current Id may flow from the anode electrode 101a to the cathode electrode 101c. Because the light-emitting layer 101b may emit light when the driving current Id flows, the light-emitting layer 101b can emit light in response to the data signal Vdata.

On the other hand, when the reset voltage Vreset is applied to the anode electrode 101a and the first power voltage EVDD is not transmitted, the voltage level of the anode electrode 101a may be lowered by the reset voltage Vreset. Accordingly, even if the data signal Vdata is supplied to the pixel circuit 101p, the driving current Id may not flow from the anode electrode 101a to the cathode electrode 101c. Accordingly, when the reset voltage Vreset is applied to the anode electrode 101a, the light-emitting device ED may not emit light. In the example of FIG. 3, the reset voltage Vreset is illustrated as being transmitted through the data line DL, but embodiments are not limited thereto. When the first power voltage EVDD is again supplied to the anode electrode 101a, the voltage level of the anode electrode 101a may increase, so that a driving current may flow through the light-emitting device ED, and the light-emitting device ED may emit light. When the first power voltage EVDD is again supplied to the anode electrode 101a, the reset voltage Vreset may not be transmitted to the anode electrode 101a.

Accordingly, because the light-emitting device ED may not emit light when the reset voltage Vreset is applied, the luminance may be temporarily lowered in the image displayed on the display device 100. In addition, when the reset voltage Vreset is periodically applied to the anode electrode 101a, as shown in the example of FIG. 4, the luminance may decrease repeatedly, resulting in a luminance change, such as when driving at 60 Hz.

For the above reasons, even if the display device 100 is driven in the second frequency mode, the user may not be able to recognize that the luminance of the image displayed on the display device 100 is deteriorated. In a state in which the voltage of the data signal Vdata is constant, the voltage level of the anode electrode 101a may be lowered by the transmission of the reset voltage Vreset, and may be raised again by the voltage level of the data signal Vdata. This period may be referred to as a "reset period."

Figure 5A:
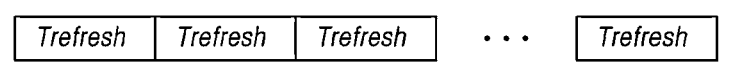
Figure 5B:
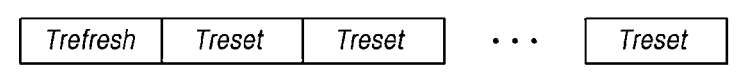

FIGS. 5A and 5B are timing diagrams illustrating an operation of the display device according to example embodiments of the present disclosure.

With reference to the example of FIG. 5A, when the display device 100 is driven in the first frequency mode, because data signals are periodically written to the pixel 101, the refresh period Trefresh, in which the data signal is written to the pixel 101, may be periodically repeated. For example, when the display device 100 is driven in a first frequency mode driven at a driving frequency of 60 Hz, the refresh period Trefresh may be repeated sixty (60) times per second.

On the other hand, with reference to the example of FIG. 5B, when the display device 100 is driven in the second frequency mode, because the data signal Vdata may be written once for a certain time, a refresh period Trefresh may appear once for a certain period of time, and a reset period Treset, in which the reset voltage Vreset is applied to the anode electrode 101a, may repeatedly appear. Accordingly, it may be possible to reduce or prevent a decrease in luminance from being recognized in the second frequency mode. For example, when the display device 100 is driven in a second frequency mode driven at 1 Hz, after the refresh period Trefresh, in which the data signal is written to the pixel 101 appears once for 1 second (1 s), the reset period Treset may appear fifty-nine (59) times in succession.

The rate (speed) at which the voltage level of the anode electrode 101a increases during the refresh period Trefresh, and the rate (speed) at which the voltage level of the anode electrode 101a increases during the reset period Treset, may be different. Due to the difference in speed at which the voltage level of the anode electrode 101a increases, the time to emit light from the light-emitting device ED may be different. Accordingly, due to a difference in speed at which the voltage level of the anode electrode 101a increases, the luminance of the display device 100 may be different. For example, due to the difference in the speed at which the voltage level of the anode electrode 101a increases, the light-emitting time (amount of light emission) of the light-emitting device ED in the refresh period Trefresh and the light-emitting time (amount of light emission) of the light-emitting device ED in the reset period Treset may be different from each other. Accordingly, the luminance of the display device 100 may be different from each other in the refresh period (Trefresh) and the reset period (Treset).

Figure 6A:
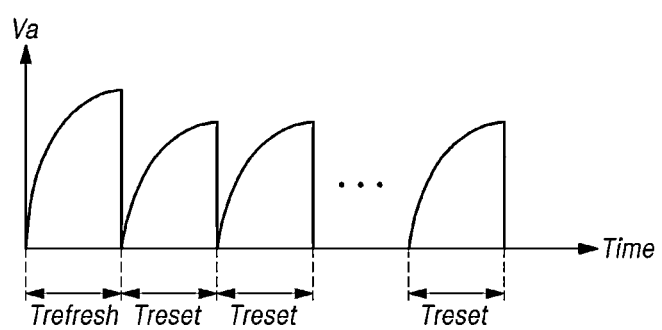
FIG. 6A is a timing diagram showing that the rate at which the voltage of the anode electrode increases in the refresh period is greater than the rate at which the voltage of the anode electrode increases in the reset period.
Figure 6B:
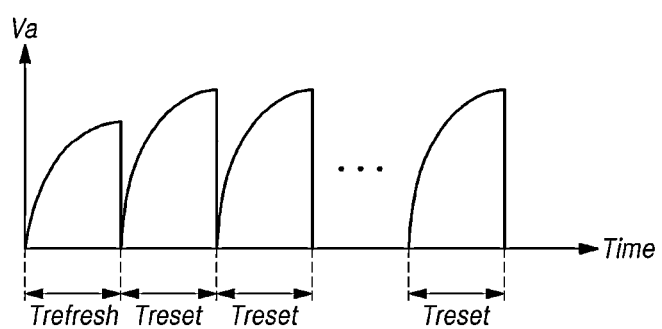
FIG. 6B is a timing diagram showing that the rate at which the voltage of the anode electrode increases in the refresh period is lower than the rate at which the voltage of the anode electrode increases in the reset period.

FIG. 6A is a timing diagram showing that the rate at which the voltage of the anode electrode increases in the refresh period is greater than the rate at which the voltage of the anode electrode increases in the reset period. FIG. 6B is a timing diagram showing that the rate at which the voltage of the anode electrode increases in the refresh period is lower than the rate at which the voltage of the anode electrode increases in the reset period.

As shown in the example of FIG. 6A, when the rate at which the voltage Va at the anode electrode 101a of the light-emitting device ED increases during the refresh period Trefresh is faster than the rate at which the voltage Va increases during the reset period Treset, the timing of emitting light from the light-emitting device ED during the refresh period Trefresh may be earlier than the timing of emitting light from the light-emitting device ED during the reset period Treset. Accordingly, the amount of light emitted by the display device 100 during the refresh period Trefresh may be greater than the amount of light emitted by the display device 100 during the reset period Treset. Accordingly, the luminance of the display device 100 during the refresh period Trefresh may be higher than that of the display device during the reset period Treset.

And, as shown in the example of FIG. 6B, when the rate at which the voltage Va increases at the anode electrode 101a of the light-emitting device ED during the refresh period Trefresh is slower than the rate at which the voltage Va increases at the anode electrode 101a during the reset period Treset, the timing of emitting light from the light-emitting device ED during the refresh period Trefresh may be later than the timing of emitting light from the light-emitting device ED during the reset period Treset. Accordingly, the amount of light emitted by the display device 100 during the refresh period Trefresh may be smaller than the amount of light emitted by the display device 100 during the reset period Treset. Accordingly, in the refresh period Trefresh, the luminance of the display device 100 may be lower than that of the display device 100 in the reset period Treset.

Accordingly, when the display device 100 operates in the second frequency mode, the amount of light emitted by the light-emitting device ED may be different in the refresh period Trefresh and the reset period Treset. Thus, a difference may occur between the luminance of the display device 100 in the refresh period Trefresh and the luminance of the display device 100 in the reset period Treset. That is, the luminance of the display device 100 during the refresh period Trefresh becomes higher or lower than the luminance of the display device 100 during the reset period Treset, and the user can recognize that the image displayed on the display device 100 is flickering.

By controlling the amount of light emitted by the light-emitting device ED during the refresh period Trefresh and the amount of light emitted from the light-emitting device ED during the reset period Treset to be the same, the problem of recognizing a flickering image can be solved. In addition, to equalize the amount of light emitted from the light-emitting device ED during the refresh period Trefresh and the amount of light emitted from the light-emitting device ED during the reset period Treset, the point in time when the driving current Id flows to the light-emitting device ED may be adjusted.

Figure 7A:
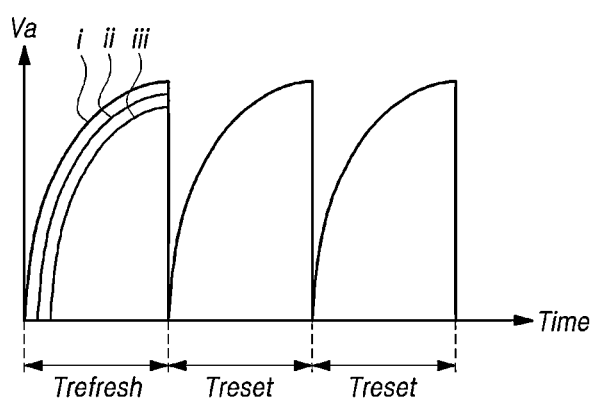
FIG. 7A is a timing diagram showing that the start point of the refresh period is adjusted.
Figure 7B:
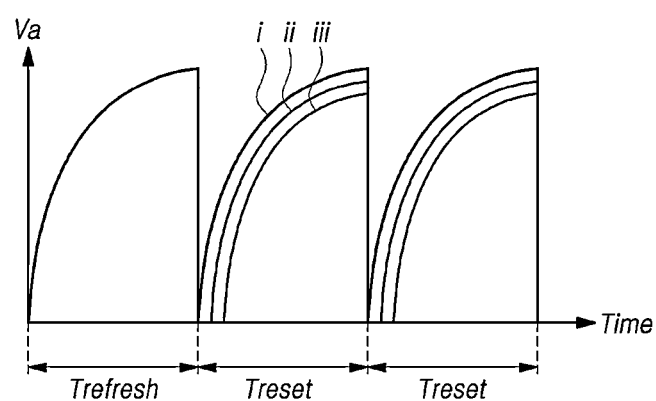
FIG. 7B is a timing diagram showing that the start point of the reset period is adjusted.
Figure 7C:
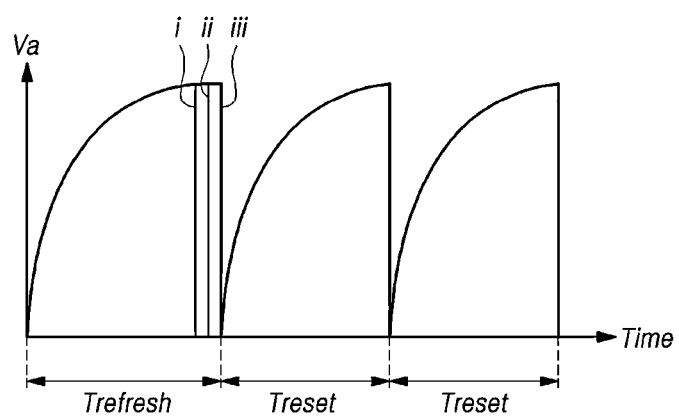
FIG. 7C is a timing diagram showing that the end point of the refresh period is adjusted.
Figure 7D:
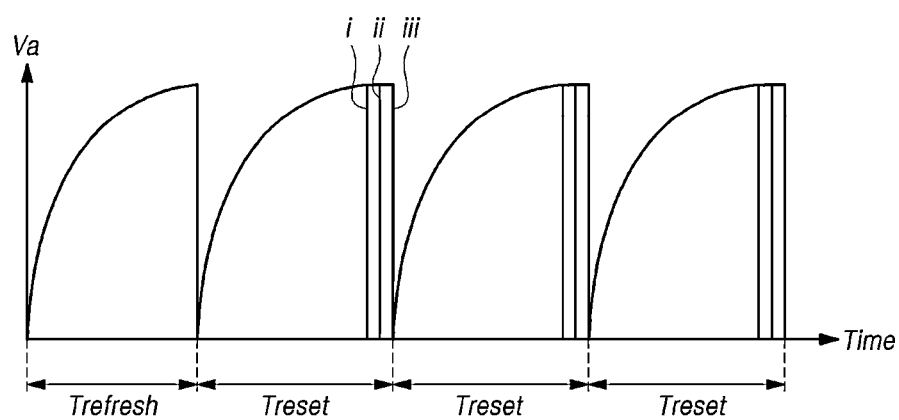
FIG. 7D is a timing diagram showing that the end point of the reset period is adjusted.

FIG. 7A is a timing diagram showing that the start point of the refresh period is adjusted. FIG. 7B is a timing diagram showing that the start point of the reset period is adjusted. FIG. 7C is a timing diagram showing that the end point of the refresh period is adjusted. FIG. 7D is a timing diagram showing that the end point of the reset period is adjusted.

Adjusting the start point and end point of the refresh period Trefresh and the start point and end point of the reset period Treset can be achieved by controlling the point in time when the driving current Id is supplied to the light-emitting device ED. As shown in the example of FIG. 7A, by controlling the start point at which the voltage level Va of the anode electrode 101a increases during the refresh period Trefresh differently, as in cases i, ii, and iii, the timing at which the driving current Id is supplied to the light-emitting device ED can be controlled differently.

With reference to the example of FIG. 7A, the time point when the voltage level Va of the anode electrode 101a rises during the refresh period Trefresh may be the fastest in case i, and may be the slowest in case iii. Based on case ii, when the luminance of the reset period Treset is lower than the luminance of the refresh period Trefresh, the start point (e.g., start timing) at which the voltage level Va of the anode electrode 101a rises during the refresh period Trefresh may be controlled to be slower, so that the start point (e.g., start timing) at which the voltage level Va of the anode electrode 101a increases during the refresh period Trefresh may become the start point in case iii. In addition, based on case ii, when the luminance of the reset period Treset is higher than the luminance of the refresh period Trefresh, the start point (e.g., start timing) at which the voltage level Va of the anode electrode 101a rises during the refresh period Trefresh may be controlled to be faster, so that the start point (e.g., start timing) at which the voltage level Va of the anode electrode 101a increases during the refresh period Trefresh may become the start point in case i.

With reference to the example of FIG. 7B, the time point when the voltage level Va of the anode electrode 101a increases during the reset period Treset may be the fastest in case i, and may be the slowest in case iii. Based on case ii, when the luminance during the reset period Treset is lower than the luminance during the refresh period Trefresh, the start point (e.g., start timing) at which the voltage level Va of the anode electrode 101a increases during the reset period Treset may be controlled to be faster, so that the start point (e.g., start timing) at which the voltage level Va of the anode electrode 101a increases during the reset period Treset may become the starting point in case i. In addition, based on case ii, when the luminance during the reset period Treset is higher than the luminance during the refresh period Trefresh, the start point (e.g., start timing) at which the voltage level Va of the anode electrode 101a increases during the reset period Treset may be controlled to be slower, so that the start point (e.g., start timing) at which the voltage level Va of the anode electrode 101a increases during the reset period Treset may become the starting point in case iii.

Further, as shown in the example of FIG. 7C, the time point at which the driving current Id supplied to the light-emitting device ED is cut off during the refresh period Trefresh may be controlled differently, as in cases i, ii, and iii, so that the timing at which the supply of the driving current Id to the light-emitting device ED is terminated may be controlled differently. With reference to the example of FIG. 7C, the time point when the driving current Id supplied to the light-emitting device ED is cut off during the refresh period Trefresh may be the fastest in case i, and may be the slowest in case iii. Based on case ii, when the luminance during the reset period Treset is higher than the luminance during the refresh period Trefresh, the blocking point (e.g., blocking timing) at which the driving current Id supplied to the light-emitting device ED is cut off during the refresh period Trefresh may be controlled to be slower, so that the blocking point (e.g., blocking timing) at which the driving current Id supplied to the light-emitting device ED is cut off during the refresh period Trefresh may become the blocking point in case iii.

Further, as shown in the example of FIG. 7D, the time point at which the driving current Id supplied to the light-emitting device ED is cut off during the reset period Treset may be controlled differently, as in cases i, ii, and iii, so that the timing at which the supply of the driving current Id to the light-emitting device ED is terminated may be controlled differently. With reference to the example of FIG. 7D, the time point when the driving current Id supplied to the light-emitting device ED is cut off during the reset period Treset may be the fastest in case i, and may be the slowest in case iii. Based on case ii, when the luminance during the reset period Treset is lower than the luminance during the refresh period Trefresh, the blocking point (e.g., blocking timing) at which the driving current Id supplied to the light-emitting device ED is cut off during the reset period Treset may be controlled to be slower, so that the blocking point (e.g., blocking timing) at which the driving current Id supplied to the light-emitting device ED is cut off during the reset period Treset may become the blocking point in case iii.

Figure 8:
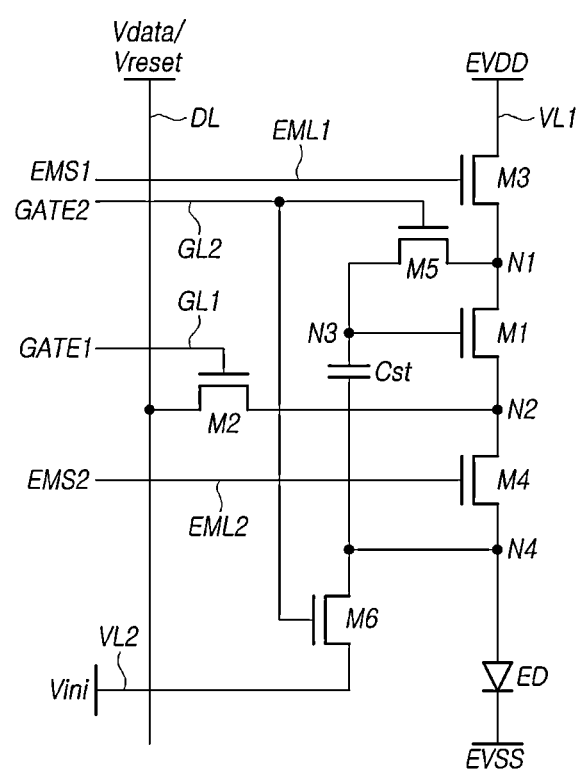
FIG. 8 is a circuit diagram illustrating an embodiment of the pixel illustrated in FIG. 1.

FIG. 8 is a circuit diagram illustrating an embodiment of the pixel illustrated in FIG. 1.

With reference to the example of FIG. 8, the pixel 101 may include the pixel circuit 101p and the light-emitting device ED. The pixel circuit 101p may include first to fourth nodes N1 to N4 as electrical nodes. A plurality of signal lines for driving the pixel circuit 101p may include a data line DL, first and second gate lines GL1 and GL2, and first and second light emission control lines EML1 and EML2.

The pixel circuit 101p may include a first transistor M1, a second transistor M2, a third transistor M3, a fourth transistor M4, a fifth transistor M5, a sixth transistor M6, and a capacitor Cst. The first transistor M1 may supply a driving current to the light-emitting device ED in response to a data signal Vdata. The second transistor M2 may supply the data signal Vdata from the data line DL to the first transistor M1 in response to a first gate signal GATE1. The third transistor M3 may supply the first power voltage EVDD to the first transistor M1 in response to a first light emission control signal EMS1. The fourth transistor M4 may supply the first power voltage EVDD, or may supply the reset voltage Vreset to the light-emitting device ED, in response to a second light emission control signal EMS2. The fifth transistor M5 may cause the first transistor M1 to be a diode connection, in response to a second gate signal GATE2. The capacitor Cst may hold the data signal Vdata supplied to the first transistor M1. The sixth transistor M6 may deliver an initialization voltage Vini for initializing the capacitor Cst and the anode electrode 101a (corresponding to the node N4) of the light-emitting device ED to the capacitor Cst, in response to the second gate signal GATE2.

The first transistor M1 may include the first electrode connected to the first node N1, a second electrode connected to the second node N2, and a gate electrode connected to the third node N3. The first transistor M1 may supply the driving current from the first node N1 to the second node N2 in response to the data signal Vdata transmitted to the third node N3.

The second transistor M2 may include a first electrode connected to the data line DL, a second electrode connected to the second node N2, and a gate electrode connected to the first gate line GL1. The second transistor M2 may supply the data signal Vdata flowing through the data line DL to the third node N3, in response to the first gate signal GATE1 transmitted to the first gate line GL1.

The third transistor M3 may have a first electrode connected to the first power voltage EVDD, a second electrode connected to the first node N1, and a gate electrode connected to the first light emission control line EML1. The first power voltage EVDD may be supplied to the first electrode of the third transistor M3 through the first power line VL1. The third transistor M3 may supply the first power voltage EVDD to the first node N1, in response to the first light emission control signal EMS1 transmitted through the first light emission control line EML1. When the third transistor M3 is turned on and the first power voltage EVDD is supplied to the first node N1, the first transistor M1 receives the first power voltage EVDD. Accordingly, when the first transistor M1 is turned on, a driving current corresponding to the data signal DL may flow from the first node N1 to the second node N2.

The fourth transistor M4 may include a first electrode connected to the second node N2, a second electrode connected to the fourth node N4, and a gate electrode connected to the second light emission control line EML2. The fourth transistor M4 may electrically connect the second node N2 and the light-emitting device ED in response to the second light emission control signal EMS2 transmitted through the second light emission control line EML2. When the fourth transistor M4 is turned on and the light-emitting device ED is electrically connected to the second node N2, the driving current flowing from the first node N1 to the second node N2 can be transferred to the light-emitting device ED. Accordingly, the light-emitting device ED can emit light.

The fifth transistor M5 may include a first electrode connected to the first node N1, a second electrode connected to the third node N3, and a gate electrode connected to the second gate line GL2. The fifth transistor M5 may electrically connect the first node N1 and the third node N3 in response to the second gate signal GL2 transmitted to the second gate line GL2. When the first node N1 and the third node N3 are electrically connected, the first transistor M1 may be in a diode-connected state. Accordingly, the first transistor M1 may operate like a diode.

The capacitor Cst may include a first electrode connected to the third node N3 and a second electrode connected to the fourth node N4. The capacitor Cst may maintain a voltage applied to the third node N3.

The sixth transistor M6 may include a first electrode connected to the initialization voltage line VL2 transmitting the initialization voltage Vini, a second electrode connected to the fourth node N4, and a gate electrode connected to the second gate line GL2. The sixth transistor M6 may be turned on in response to the second gate signal GATE2 to transmit the initialization voltage Vini transmitted through the initialization voltage line VL2 to the fourth node N4. The fourth node N4 may be connected to the second electrode of the capacitor Cst and the anode electrode 101a of the light-emitting device ED. When the sixth transistor M6 is turned on, the second electrode of the capacitor Cst and the anode electrode 101a of the light-emitting device ED may be initialized by the initialization voltage Vini.

In the light-emitting device ED, the anode electrode 101a may be electrically connected to the fourth node N4 and the cathode electrode 101c may be electrically connected to the second power voltage EVSS. The light-emitting device ED may emit light by the amount of current flowing from the anode electrode 101a to the cathode electrode 101c. The light-emitting device ED may emit light when the fifth transistor M5 is turned on and a driving current is supplied from the first transistor M1.

As shown in the example of FIG. 8, the reset voltage Vreset is supplied to the data line DL, and the reset voltage Vreset supplied to the data line DL may be transmitted to the anode electrode 101a of the light-emitting device ED through the second transistor M2 and the fourth transistor M4. In FIG. 8, the reset voltage Vreset is shown to be transmitted to the anode electrode 101a of the light-emitting device ED through the data line DL, but embodiments are not limited thereto. The reset voltage Vreset may be transmitted to the anode electrode 101a of the light-emitting device through a separate line different from the data line DL. In addition, the circuit diagram of the pixel is shown in FIG. 8 for illustrative purpose only, and embodiments of the present disclosure are not limited thereto. For example, the pixel in the display device of the present disclosure may have various circuit structures in addition to the circuit structure shown in FIG. 8.

Figure 9:
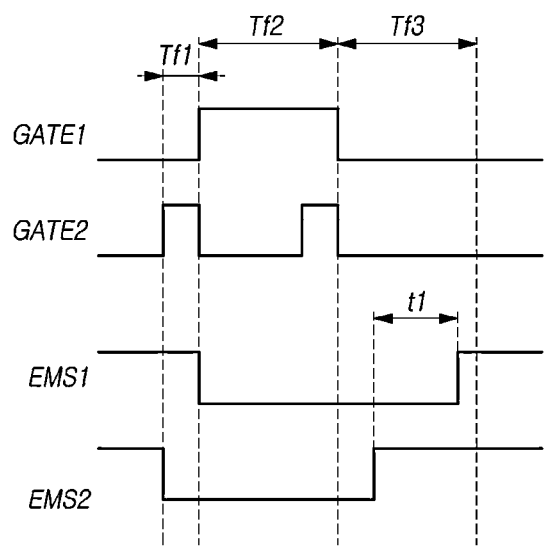
FIG. 9 is a timing diagram illustrating an operation in a refresh period of the pixel shown in FIG. 8.

FIG. 9 is a timing diagram illustrating an operation in a refresh period of the pixel shown in FIG. 8.

With reference to the example of FIG. 9, the refresh period Trefresh is a period in which light is emitted in response to the data signal Vdata written in the pixel 101 after the data signal Vdata is written in the pixel 101. The refresh period Trefresh may include the first to third periods Tf1 to Tf3.

In the first period Tf1, the first gate signal GATE1 may be transmitted in a low state (also referred to as an "off state" or a "turn-off level voltage state"), and the second gate signal GATE2 may be transmitted in a high state (also referred to as an "on state" or "turn-on level voltage state"). In addition, in the first period Tf1, the first light emission control signal EMS1 may be transmitted in the high state and the second light emission control signal EMS2 may be transmitted in the low state. Here, each of the gate signals GATE1 and GATE2 and the light emission control signals EMS1 and EMS2 may have the low state or the high state. For example, in some embodiments of the present disclosure, the first to sixth transistors M1 to M6 are n-type transistors. In this case, the low state (low level voltage state) of signals (GATE1, GATE2, EMS1, and EMS2) may be a turn-off level voltage state, and the high state (high level voltage state) of signals (GATE1, GATE2, EMS1, and EMS2) may be a turn-on level voltage state. In another example, all or part of the first to sixth transistors M1 to M6 may be applied as p-type. In this case, in the signal applied to the p-type transistor, the low state may be a turn-on level voltage state, and the high state may be a turn-off level voltage state. Adjustments of voltage levels based on the type of transistors used should be understood by one of ordinary skill in the art.

Accordingly, the second transistor M2 and the fourth transistor M4 may be turned off, and the third transistor M3, the fifth transistor M5, and the sixth transistor M6 may be turned on. When the sixth transistor M6 is turned on, the initialization voltage Vini transmitted through the initialization voltage line VL2 may be supplied to the fourth node N4 through the sixth transistor M6. At this time, because the second transistor M2 and the fourth transistor M4 are in the off state and the third transistor M3 and the fifth transistor M5 are in the on state, the capacitor Cst and the anode electrode 101a of the light-emitting device ED may be initialized by the initialization voltage Vini.

In addition, in the second period Tf2, the first gate signal GATE1 may be in the high state, and the second gate signal GATE2 may be in the low state for a certain period of the second period Tf2, and then may be changed to the high state for the remainder of the second period Tf2. In addition, in the second period Tf2, the first light emission control signal EMS1 and the second light emission control signal EMS2 may be in the low state.

When the first gate signal GATE1 is in the high state, the second transistor M2 may be turned on. Accordingly, the data signal Vdata supplied to the data line DL may be transmitted to the second node N2. In addition, when the second gate signal GATE2 is in the low state, the fifth transistor M5 and the sixth transistor M6 may be in the off state. Accordingly, the initialization voltage Vini may not be transmitted to the capacitor Cst and the anode electrode 101a of the light-emitting device ED.

In addition, when the second gate signal GATE2 changes to the high state, the fifth transistor M5 may be turned on. Accordingly, the first transistor M1 may be in a diode connection state. When the first transistor M1 is in a diode connection state, the data signal Vdata transmitted to the second node N2 may be supplied to the third node N3 through the first node N1. In this case, when the data signal Vdata is supplied to the third node N3, the threshold voltage of the first transistor M1 may be compensated. Accordingly, the data signal Vdata stored in the third node N3 may have a voltage value in which the threshold voltage of the first transistor M1 may be compensated.

In addition, in the third period Tf3, the first gate signal GATE1 and the second gate signal GATE2 may be in the low state, and the second light emission control signal EMS2 and the first light emission control signal EMS1 may be sequentially changed from the low state to the high state. In the third period Tf3, the second transistor M2, the fifth transistor M5, and the sixth transistor M6 may be turned off by the first gate signal GATE1 and the second gate signal GATE2. In the third period Tf3, the third transistor M3 and the fourth transistor M4 may be sequentially turned on by the second light emission control signal EMS2 and the first light emission control signal EMS1.

When the third transistor M3 and the fourth transistor M4 are sequentially turned on, a driving current may flow from the first node N1 to the second node N2 by the first transistor M1. Accordingly, the driving current may be supplied to the light-emitting device ED, and the light-emitting device ED may emit light in response to the supplied driving current.

In this case, the third transistor M3 and the fourth transistor M4 may be turned on with a difference between the first time period t1. That is, the fourth transistor M4 may be turned on first, and the third transistor M3 may be turned on later. After the first time period t1 elapses from the point when the fourth transistor M4 is turned on, the third transistor M3 may be turned on. The first time period t1 may be adjusted according to the rate at which the voltage of the anode electrode of the light-emitting device ED increases during the refresh period Trefresh or the reset period Treset.

When the rate at which the voltage of the anode electrode increases during the refresh period is faster than the rate at which the voltage of the anode electrode increases during the reset period, the first time period t1 may be set to be short. In addition, when the rate at which the voltage of the anode electrode increases during the refresh period is slower than the rate at which the voltage of the anode electrode increases during the reset period, the first time period t1 may be set longer. When the third transistor M3 is turned on, the first power voltage EVDD may be applied to the first transistor M1 of the pixel 101, so that the driving current can flow from the first transistor M1. Accordingly, to shorten the first time period t1, the turn-on timing of the third transistor M3, which may be turned on after the fourth transistor M4 is turned on, may be accelerated (e.g., made faster). To set the first time period t1 to be long, the turn-on timing of the third transistor M3, that is turned on after the fourth transistor M4 is turned on, may be delayed (slower).

Figure 10:
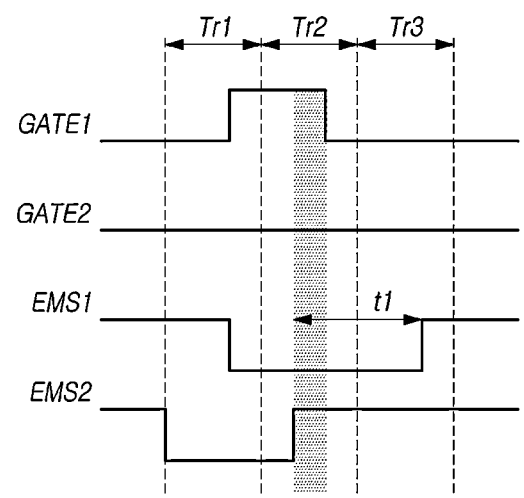
FIG. 10 is a timing diagram illustrating an operation in a reset period of the pixel shown in FIG. 8.

FIG. 10 is a timing diagram illustrating an operation in a reset period of the pixel shown in FIG. 8.

With reference to the example of FIG. 10, the reset period Treset may be a period in which the luminance of an image displayed on the display device 100 decreases by supplying a reset voltage Vreset to the anode electrode 101a of the light-emitting device ED to reduce or prevent the driving current from being supplied to the light-emitting device ED. During a period in which one data signal Vdata is written to the capacitor Cst and the data signal Vdata is maintained in the capacitor Cst, the reset period Treset may be repeated, thereby reducing or preventing the user from recognizing the decrease in luminance of the image.

The reset period Treset may include a first to third periods Tr1 to Tr3. In the reset period Treset, to reduce or prevent the data signal Vdata from being transmitted to the pixel 101, the second gate signal GATE2 may be maintained in a low state. Accordingly, the fifth transistor M5 and the sixth transistor M6 may be maintained in the off state during the reset period Treset. In addition, during the reset period Treset, the data signal Vdata transmitted in the refresh period Trefresh may be maintained at the capacitor Cst.

In the first period Tr1, the reset voltage Vreset may be transmitted to the data line DL. However, embodiments of the present disclosure are not limited thereto, and the reset voltage Vreset in the first period Tr1 may be transmitted through a separate line different from the data line DL. In addition, in the first period Tr1, the first gate signal GATE1 may change from the low state to the high state, and the first light emission control signal EMS1 may change from the high state to the low state. In addition, the second light emission control signal EMS2 may maintain the low state. Accordingly, in the first period Tr1, the second transistor M2 may be turned on, and the third transistor M3 and the fourth transistor M4 may be turned off. When the second transistor M2 is turned on, the reset voltage Vreset supplied to the data line DL may be transmitted to the second node N2 through the second transistor M2.

Then, in the second period Tr2, the first light emission control signal EMS1 may maintain the low state, the first gate signal GATE1 may change from a high state to a low state, and the second light emission control signal EMS2 may change from the low state to the high state. In the second period Tr2, a period in which the first gate signal GATE1 maintains the high state and a period in which the second light emission control signal EMS2 maintains the high state may overlap. That is, a period in which the fourth transistor M4 is turned on may overlap a period in which the second transistor M2 is turned on. While in the refresh period Trefresh, the period in which the fourth transistor M4 is turned on may not overlap the period in which the second transistor M2 is turned on, as shown in the example of FIG. 9.

When the first light emission control signal EMS1 is maintained in a low state, the third transistor M3 may be maintained in an off state, so that the first power voltage EVDD may not be supplied to the pixel 101. In addition, during a period in which both the first gate signal GATE1 and the second light emission control signal EMS2 are in the high state, the second transistor M2 and the fourth transistor M4 may be turned on. Accordingly, the reset voltage Vreset supplied to the data line DL may be transmitted to the fourth node N4 through the second node N2. Accordingly, the anode electrode 101a of the light-emitting device ED may be initialized by the reset voltage Vreset.

When the anode electrode 101a of the light-emitting device ED is initialized by the reset voltage Vreset, the voltage of the anode electrode 101a of the light-emitting device ED may be lowered, and the driving current may not be supplied to the light-emitting device ED. Accordingly, when the anode electrode 101a of the light-emitting device ED is initialized by the reset voltage Vreset, the light-emitting device ED may not emit light, so that the luminance of the image displayed on the display device 100 may decrease.

In addition, in the third period Tr3, the first gate signal GATE1 may maintain the low state, and the second light emission control signal EMS2 may maintain the high state. During the third period Tr3, the first light emission control signal EMS1 may change from the low state to the high state. The timing at which the first light emission control signal EMS1 changes from the low state to the high state may be after the first time period t1 has elapsed from the time when the second light emission control signal EMS2 changes from the low state to the high state. In this case, the first time period t1 may be adjusted according to the rate at which the voltage of the anode electrode 101a increases during the refresh period Trefresh or the reset period Treset.

In the refresh period Trefresh or the reset period Treset, when the rate at which the voltage of the anode electrode 101a increases is fast, the first time period t1 may be set to be short. In the refresh period Trefresh or the reset period Treset, when the rate at which the voltage of the anode electrode 101a increases is slow, the first time period t1 may be set to be long. To shorten the first time period t1, the timing at which the third transistor M3 is turned on after the fourth transistor M4 is turned on may be controlled to be relatively advanced. To set the first time period t1 to be long, a time point at which the third transistor M3 is turned on after the fourth transistor M4 is turned on may be controlled to be relatively delayed.

Figure 11:
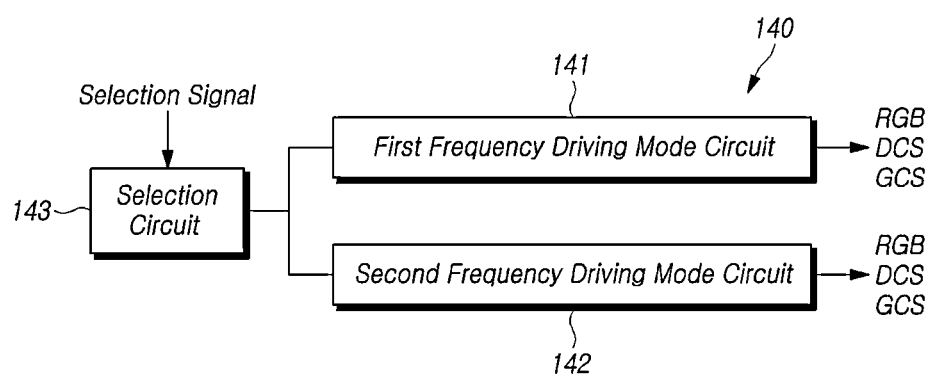
FIG. 11 is a structural diagram illustrating the timing controller shown in FIG. 1.

FIG. 11 is a structural diagram illustrating the timing controller shown in FIG. 1.

With reference to the example of FIG. 11, the timing controller 140 may include a first frequency driving mode circuit 141 performing a first frequency mode and a second frequency driving mode circuit 142 performing a second frequency mode. In addition, the timing controller 140 may select the first frequency driving mode circuit 141 or the second frequency driving mode circuit 142 in response to the selection signal.

When the first frequency driving mode circuit 141 is selected by the selection signal, the timing controller 140 may output a data control signal DCS and a gate control signal GCS in response to the first frequency. For example, the data control signal DCS may include a clock, a start pulse, a synchronization signal, and the like. The timing controller 140 may supply the image signal RGB to the data driver circuit 120, based on a synchronization signal and a clock signal output in response to the first frequency. The timing controller 140 may cause the data driver circuit 120 to supply the data signal Vdata to the pixel 101 through the data line DL in response to the first frequency.

In addition, when the second frequency driving mode circuit 142 is selected by the selection signal, the timing controller 140 may output the data control signal DCS and the gate control signal GCS in response to the second frequency. For example, the data control signal DCS may include a clock, a start pulse, a synchronization signal, and the like. In addition, the timing controller 140 may supply the image signal RGB to the data driver circuit 120 based on a synchronization signal and a clock signal output in response to the second frequency. In addition, the timing controller 140 may cause the data driver circuit 120 to supply the data signal Vdata or the reset voltage Vreset to the pixel 101 through the data line DL in response to the second frequency.

The timing controller 140 may store information on the first time period t1, as shown in the examples of FIG. 9 or 10. The timing controller 140 may adjust the timing at which the first light emission control signal EMS1 and the second light emission control signal EMS2 are output, based on the stored first time period t1.

After the fourth transistor M4 is turned on by the second light emission control signal EMS2, the first time period t1, that elapses until the third transistor M3 is turned on by the first light emission control signal EMS1, may be adjusted. Accordingly, a time point, at which the refresh period Trefresh or the reset period Treset starts, may be adjusted. Accordingly, a difference in luminance of images, displayed on the display device 100 during the refresh period Trefresh and the reset period Treset, may be suppressed to reduce or prevent the user from recognizing that the image flickers in the second frequency mode. In addition, the timing controller 140 may further include a selection circuit 143 that may receive the selection signal, and may select the first frequency driving mode circuit 141 or the second frequency driving mode circuit 142, based on the selection signal.

Figure 12:
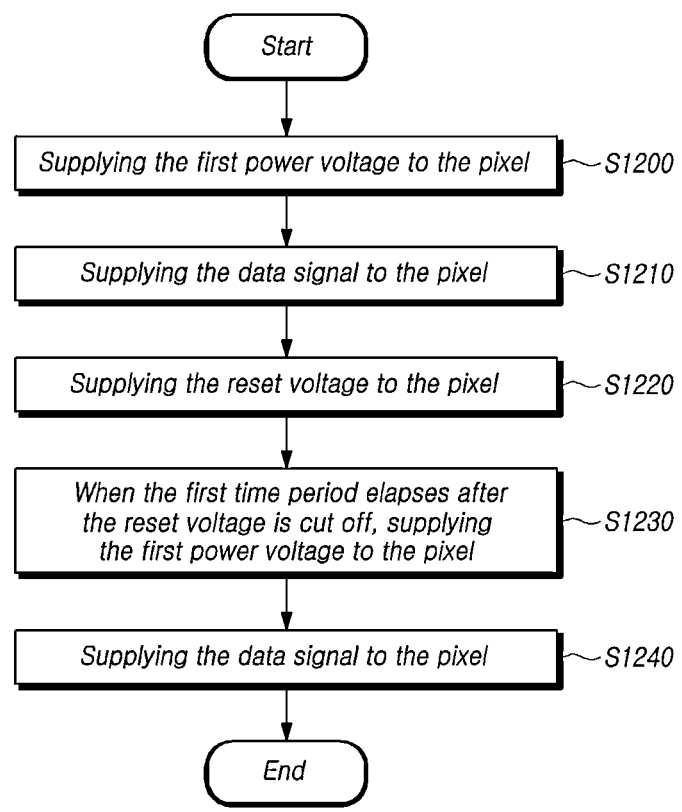
FIG. 12 is a flowchart illustrating a method of driving a display device according to example embodiments of the present disclosure.

FIG. 12 is a flowchart illustrating a method of driving the display device according to example embodiments of the present disclosure.

With reference to the example of FIG. 12, a pixel 101 in the display device 100 may receive a first power voltage EVDD (S1200). Also, the pixel 101 may receive a second power voltage EVSS having a lower voltage level than the first power voltage EVDD.

The pixel 101 may receive the data signal Vdata (S1210). The data signal Vdata may be transmitted to the pixel 101 through the data line DL. The pixel 101 may include a light-emitting device ED that may emit light by a driving current flowing from the first power voltage EVDD to the second power voltage EVSS. The pixel 101 may receive the data signal Vdata in response to the gate signal. The gate signal may include a first gate signal GATE1 and a second gate signal GATE2. Also, when the pixel 101 receives the data signal Vdata while receiving the first power voltage EVDD, the pixel 101 may generate a driving current corresponding to the data signal Vdata. The driving current may be supplied to the light-emitting device ED.

A reset voltage Vreset may be supplied to the pixel 101 (S1220). The reset voltage Vreset may be supplied to the pixel 101 through the data line DL. However, embodiments are not limited thereto, and the pixel 101 may receive the reset voltage Vreset through a line different from the data line DL. The reset voltage Vreset supplied to the pixel 101 may be supplied to the anode electrode 101a of the light-emitting device ED. When the reset voltage Vreset is supplied to the anode electrode 101a of the light-emitting device ED, the power voltage EVDD may not be supplied to the pixel 101.

Because the first power voltage EVDD may not be supplied to the pixel 101, the voltage level of the anode electrode 101a receiving the reset voltage Vreset may be lowered. Accordingly, the driving current may not flow through the light-emitting device ED. When the driving current does not flow through the light-emitting device ED, the light-emitting device ED may not emit light, so that the luminance of an image displayed on the display device 100 may be lowered. Also, the voltage level of the reset voltage Vreset may be a voltage level lower than the threshold voltage of the light-emitting device ED included in the pixel 101.

When the first time period t1 elapses after the reset voltage Vreset is transmitted to the light-emitting device, the first power voltage EVDD may be supplied to the pixel 101 again (S1230). When the first power voltage EVDD is supplied to the pixel 101, the voltage level of the anode electrode of the light-emitting device ED may increase again. Accordingly, a driving current may flow through the light-emitting device ED, and the light-emitting device ED may emit light again. In addition, after the reset voltage Vreset is supplied again and the reset voltage Vreset is transmitted to the light-emitting device again, when the first time period t1 elapses, the first power voltage EVDD may be supplied to the pixel 101. While the data signal Vdata is maintained, the reset voltage Vreset and the first power voltage EVDD may be repeatedly supplied.

In addition, the length of the first time period t1 may be adjusted by adjusting the timing at which the first power voltage EVDD is supplied to the pixel 101. There may be a difference between a first luminance of the image after the data signal Vdata is supplied and before the reset voltage Vreset is supplied, and a second luminance of the image after one reset voltage Vreset is supplied and before the next reset voltage Vreset is supplied. In this case, the first time period t1, after which the first power voltage EVDD is supplied, may be adjusted. Here, it has been described that the first power voltage EVDD may be supplied after the reset voltage Vreset is cut off, but embodiments are not limited thereto, and the reset voltage Vreset may be cut off after the first power voltage EVDD is first supplied.

In addition, a data signal Vdata may be supplied to the pixel 101 again (S1240). The data signal Vdata may be newly stored in the capacitor Cst in the pixel 101 by the data signal Vdata supplied to the pixel 101. In addition, after the capacitor Cst is initialized, the data signal Vdata may be stored in the capacitor Cst.

In addition, the display device 100 may be driven in one of a first frequency mode driven with a first frequency, and a second frequency mode driven with a second frequency lower than the first frequency. The display device 100 may supply the reset voltage Vreset while the data signal Vdata may be maintained to the pixel 101 in the second frequency mode. The first frequency mode and the second frequency mode may be selected by the timing controller 140.

Each of the first frequency mode and the second frequency mode may include a light-emitting period that may emit light from the display device 100, and a non-emission period that may not emit light from the display device 100. The number of times the emission period and the non-emission period occur in the display device 100 may be the same in the first frequency mode and the second frequency mode.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
   a display panel comprising a pixel comprising a light-emitting device, the pixel being driven in a first frequency mode or a second frequency mode;
   a data driver circuit configured to supply a data signal to the pixel through a data line; and
   a gate driver circuit configured to supply at least one gate signal and at least one light emission control signal including a first light emission control signal,
   wherein the light-emitting device is configured to emit light by a driving current flowing from a first power voltage to a second power voltage in response to the data signal, the first power voltage and the second power voltage being applied to different portions of the light-emitting device,
   wherein the pixel is configured to receive a reset signal at least once between data signals received by the pixel at different times, and
   wherein the first light emission control signal is supplied based on a first time period.

2. The display device of claim 1, further comprising: a timing controller comprising a first frequency driving mode circuit configured to perform the first frequency mode, and a second frequency driving mode circuit configured to perform the second frequency mode.

3. The display device of claim 2, wherein the timing controller is configured to store information on the first time period, and adjust a timing at which the first light emission control signal is output based on the stored information on the first time period.

4. The display device of claim 1, wherein the at least one light emission control signal further comprises a second light emission control signal different from the first light emission control signal, and
   wherein the first time period is a time difference between the first light emission control signal and the second light emission control signal.

5. The display device of claim 1, wherein the pixel further comprises: a first transistor configured to supply the driving current to the light-emitting device, in response to the data signal; and
   a second transistor electrically connected between the first transistor and the light-emitting device.

6. The display device of claim 5, wherein the at least one light emission control signal further comprises a second light emission control signal different from the first light emission control signal,
   wherein the second transistor is controlled by the second light emission control signal.

7. The display device of claim 6, wherein the pixel further comprises:
   a third transistor configured to supply the data signal to the first transistor, in response to a first gate signal;
   a fourth transistor configured to supply the first power voltage to the first transistor, in response to a first light emission control signal;
   a fifth transistor configured to cause the first transistor to be in a diode connection, in response to a second gate signal;
   a capacitor configured to hold the data signal supplied to the first transistor; and
   a sixth transistor configured to transmit an initialization voltage for initializing the capacitor and the anode electrode to the capacitor, in response to a second gate signal.

8. The display device according to claim 7, wherein a period in which the second transistor is turned on overlaps a period in which the third transistor is turned on.

9. The display device according to claim 7, wherein after the first time period elapses after the second transistor is turned on, the fourth transistor is turned on, and the first time period is adjusted according to a rate at which a voltage of the anode electrode of the light-emitting device increases during a refresh period or reset period.

10. The display device according to claim 7, wherein the reset signal is supplied to the light-emitting device through the data line, the third transistor, and the second transistor.

11. The display device according to claim 7, wherein an initialization voltage for initializing at least one of the capacitor and an anode electrode of the light-emitting device is supplied to the at least one the capacitor and the anode electrode through the sixth transistor.

12. The display device according to claim 7, wherein the fifth transistor and the sixth transistor are turned off during a refresh period.

13. The display device according to claim 1, wherein the light-emitting device comprises:
   an anode electrode;
   a cathode electrode; and a light-emitting layer between the anode electrode and the cathode electrode, wherein the first power voltage or the reset signal is transmitted to the anode electrode, and the second power voltage is transmitted to the cathode electrode.

14. The display device according to claim 1, wherein while the data signal is maintained, the reset signal and the first power voltage are repeatedly supplied to the light-emitting device at least two or more times.

15. The display device of claim 1, wherein each of the first frequency mode and the second frequency mode comprises:
at least one light emission period, and
at least one non-light emission period, and
wherein, in the first frequency mode and the second frequency mode, respective numbers of times that the light emission period and the non-light emission period are generated are the same.

16. The display device of claim 1, wherein, when the first time period elapses after the reset signal is transmitted to the light-emitting device, the first power voltage is transferred to the light-emitting device.

17. The display device according to claim 16, wherein the first time period is adjusted based on a rate at which voltage of the anode electrode of the light-emitting device increases during a refresh period or reset period.

18. The display device according to claim 17, wherein the rate at which the voltage of the anode electrode increases during the refresh period is greater than the rate at which the voltage of the anode electrode increases during the reset period.

19. The display device according to claim 17, wherein when the rate at which the voltage of the anode electrode increases during the refresh period is less than the rate at which the voltage of the anode electrode increases during the reset period, the first time period is set longer.

20. The display device according to claim 17, wherein the first time period set when the rate at which the voltage of the anode electrode increases during the refresh period is faster than the rate at which the voltage of the anode electrode increases during the reset period is shorter than the first time period set when the rate at which the voltage of the anode electrode increases during the refresh period is slower than the rate at which the voltage of the anode electrode increases during the reset period.

\* \* \* \* \*